United States Patent
Kim et al.

(10) Patent No.: US 12,508,856 B2
(45) Date of Patent: Dec. 30, 2025

(54) TOWING PIPE CONNECTION STRUCTURE

(71) Applicants: Kia Corporation, Seoul (KR); Hyundai Motor Company, Seoul (KR)

(72) Inventors: Hyunsik Kim, Seoul (KR); Ildo Kim, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 533 days.

(21) Appl. No.: 18/051,418

(22) Filed: Oct. 31, 2022

(65) Prior Publication Data

US 2023/0158846 A1 May 25, 2023

(30) Foreign Application Priority Data

Nov. 19, 2021 (KR) .................. 10-2021-0159979

(51) Int. Cl.

| | |
|---|---|
| *F16B 5/00* | (2006.01) |
| *B60D 1/01* | (2006.01) |
| *B60D 1/56* | (2006.01) |
| *B60R 19/02* | (2006.01) |
| *B62D 29/00* | (2006.01) |

(52) U.S. Cl.
CPC .............. *B60D 1/56* (2013.01); *B60D 1/01* (2013.01); *B60R 19/023* (2013.01); *B62D 29/008* (2013.01); *F16B 5/00* (2013.01)

(58) Field of Classification Search
CPC .......... B60D 1/56; B60D 1/01; B60D 29/008; B60R 19/023; F16B 5/00

USPC ........................................................ 280/500
See application file for complete search history.

(56) References Cited

U.S. PATENT DOCUMENTS

| | | | | |
|---|---|---|---|---|
| 5,738,362 | A * | 4/1998 | Ludwick | B60R 3/02 280/166 |
| 6,511,086 | B2 * | 1/2003 | Schlicht | B60R 3/02 280/166 |
| 6,685,204 | B1 * | 2/2004 | Hehr | B60R 3/02 280/166 |
| 7,503,572 | B2 * | 3/2009 | Park | B60R 3/02 280/165 |
| 7,967,311 | B2 * | 6/2011 | Phillips | B60R 3/007 280/166 |
| 10,099,620 | B1 * | 10/2018 | Sgroi | B60R 3/00 |
| 10,173,617 | B2 * | 1/2019 | Rabe | B60R 19/18 |
| 2002/0060442 | A1 * | 5/2002 | Andersen | B60D 1/28 280/504 |
| 2003/0057676 | A1 * | 3/2003 | Griggs | B60D 1/58 280/507 |

\* cited by examiner

*Primary Examiner* — Hau V Phan
(74) *Attorney, Agent, or Firm* — Slater Matsil, LLP

(57) ABSTRACT

In an embodiment a towing pipe connection structure includes a vehicle body rear member including an aluminum material, a towing pipe at least partially including an aluminum material and a connection bracket including a bumper back beam plate in contact with a back panel of a vehicle body and including an insertion hole into which the towing pipe is inserted, an engage plate having an engage hole to which the towing pipe is connected and a connection plate connecting the bumper back beam plate and the engage plate, wherein the connection bracket is connected to a rear member of the vehicle body, and wherein the connection bracket includes an aluminum material.

19 Claims, 10 Drawing Sheets

TOWING PIPE CONNECTION STRUCTURE

CROSS-REFERENCE TO RELATED APPLICATIONS

This application claims priority to and the benefit of Korean Patent Application No. 10-2021-0159979 filed in the Korean Intellectual Property Office on Nov. 19, 2021, the entire contents of which are incorporated herein by reference.

TECHNICAL FIELD

The present invention relates to a towing pipe connection structure. More particularly, the present invention relates to a towing pipe connection structure that may improve connectivity while reducing the number of entire parts.

BACKGROUND

A towing pipe for towing of the vehicle is mounted on the vehicle body.

For the enhancement of fuel efficiency of vehicles, relatively light materials, for example, aluminum materials, are increasingly applied to all or part of the vehicle body.

In general, when the rear member of the vehicle body is made of aluminum extrusion, a steel material is often applied to the connecting part connecting the towing pipe and the rear member of the vehicle body for the purpose of cost reduction.

However, in this case, the material of the rear member of the vehicle body and the connection part, or the towing pipe and the connection part are different, so a complex structure to combine them is involved, and in this process, a lot of cost and weight increase may occur.

The above information disclosed in this Background section is only for enhancement of understanding of the background of the invention, and therefore it may contain information that does not form the prior art that is already known in this country to a person of ordinary skill in the art.

SUMMARY

Embodiments provide a towing pipe connection structure that may improve connectivity while reducing the entire number of parts.

A towing pipe connection structure according to an exemplary embodiment of the present invention may include a vehicle body rear member made of aluminum material, a towing pipe at least partially made of aluminum material, and a connection bracket including a bumper back beam plate, which is in contact with a back panel of a vehicle body and of which an insertion hole into which the towing pipe is inserted is formed thereto, an engage plate of which an engage hole to which the towing pipe is connected is formed thereto, and a connection plate connecting the bumper back beam plate and the engage plate, and the connection bracket connected to the vehicle body rear member, and the connection bracket is made of aluminum material.

The towing pipe may be entirely made of aluminum material. The towing pipe may be welded around the insertion hole and around the engage hole.

The back panel in contact with the bumper back beam plate may be made of aluminum material, and the bumper back beam plate and the back panel may be welded together.

The thickness of the bumper back beam plate is thicker than the thickness of the engage plate, and the thickness of the engage plate is thicker than the thickness of the connection plate.

The connection plate may include at least two side plates connected to the vehicle body rear member.

The bumper back beam plate and the vehicle body rear member may be welded together.

The towing pipe may include a steel portion that is made of a steel material and is inserted into the bumper back beam plate, and an aluminum portion made of aluminum material and inserted into the engage hole.

The steel portion and the aluminum portion may be screwed together.

The back panel in contact with the bumper back beam plate may be made of a steel material, and the steel portion and the back panel may be welded together.

The aluminum portion may be welded around the engage hole.

The aluminum portion may include a first body to be welded around the engage hole, and a second body connected to the first body and inserted into the engage hole with a cross-section smaller than the first body.

The connection plate may include at least two side plates connected with the vehicle body rear member.

The connection plate may further include at least one reinforcement plate connecting the bumper back beam plate and the engage plate between the side plates.

The connection plate may further include two reinforcement plates connecting the bumper back beam plate and the engage plate between the side plates, and the two reinforcement plates may support the towing pipe.

According to the towing pipe connection structure according to an exemplary embodiment of the present invention, it is possible to improve the connectivity while reducing the entire number of parts.

According to an exemplary embodiment of the towing pipe connection structure according to the present invention, the cross-section of the vehicle body rear member may have a uniform shape, so that uniform transmission of the impact load is possible during vehicle collision.

In addition, for the effects that can be obtained or predicted due to an exemplary embodiment of the present invention, it is to be disclosed directly or implicitly in the detailed description of an exemplary embodiment of the present invention. That is, various effects predicted according to an exemplary embodiment of the present invention will be disclosed within a detailed description to be described later.

BRIEF DESCRIPTION OF THE DRAWINGS

Since these drawings are for reference in explaining an exemplary embodiment of the present invention, the technical idea of the present invention should not be construed as being limited to the accompanying drawings.

DETAILED DESCRIPTION OF ILLUSTRATIVE EMBODIMENTS

Figure 1:
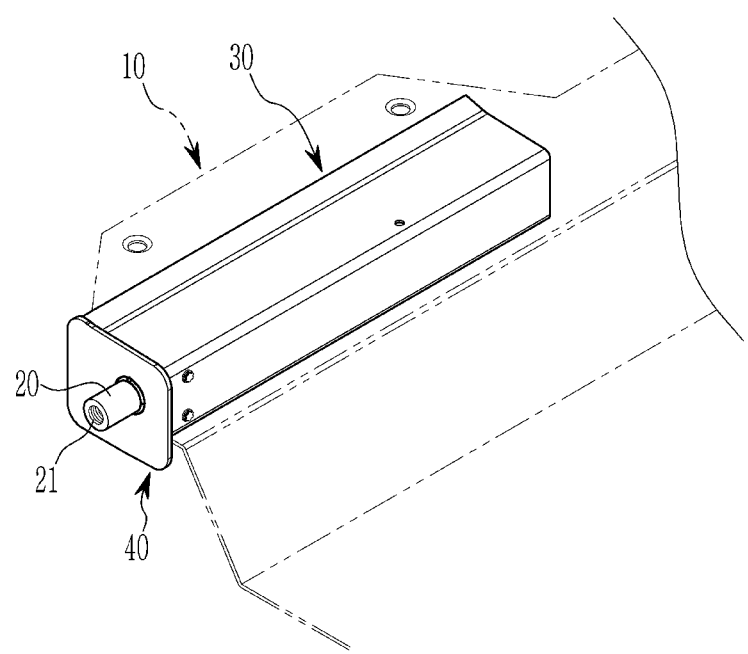
FIG. 1 is a partial perspective view of a vehicle body to which a towing pipe connection structure according to an exemplary embodiment of the present invention may be applied.

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

In order to clearly describe the present invention, parts irrelevant to the description are omitted, and the same reference numerals are assigned to the same or similar elements throughout the specification.

Since the size and thickness of each component shown in the drawing are arbitrarily indicated for convenience of explanation, the present invention is not necessarily limited to that shown in the drawing, and the thickness is enlarged to clearly express various parts and areas.

In addition, in the detailed description below, the reason that the names of the components are divided into first, second, etc. is to classify the components in the same relationship, and the order is not necessarily limited in the following description.

Throughout the specification, when a part includes a certain component, it means that other components may be further included, rather than excluding other components, unless otherwise stated.

In addition, terms such as . . . part, . . . means described in the specification mean a unit of a comprehensive configuration that performs at least one function or operation.

When a part, such as a layer, film, region, plate, etc., is "on" another part, it includes not only the case where it is directly above the other part, but also the case where there is another part in between.

In contrast, when an element is referred to as being "directly on" another element, there are no intervening elements present.

An exemplary embodiment of the present invention will hereinafter be described in detail with reference to the accompanying drawings.

Figure 2:
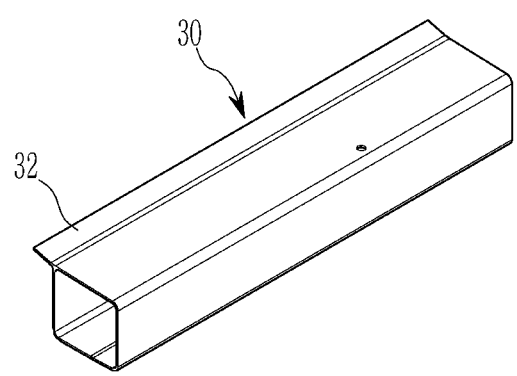
FIG. 2 is a perspective view of a vehicle body rear member to which a towing pipe connection structure according to an exemplary embodiment of the present invention may be applied.

FIG. 1 is a partial perspective view of a vehicle body to which a towing pipe connection structure according to an exemplary embodiment of the present invention may be applied, and FIG. 2 is a perspective view of a vehicle body rear member to which a towing pipe connection structure according to an exemplary embodiment of the present invention may be applied.

A towing pipe connection structure according to an exemplary embodiment of the present invention may include a vehicle body rear member 30 mounted on a rear of the vehicle body 10, a towing pipe 20 and a connection bracket 40 connecting the vehicle body rear member 30 and the towing pipe 20.

For the enhancement of fuel efficiency of a vehicle, a relatively light material, for example, aluminum material, is increasingly applied to all or part of the vehicle body, and similarly, the vehicle body rear member 30 may be formed of aluminum material.

Further, the vehicle body rear member 30 may be an extruded member. Also, as shown in FIG. 2, the vehicle body rear member 30 may have a polygonal cross-section, for example, a rectangular cross-section shape, and may have a simple shape with no change in thickness or shape in the length direction.

Figure 3:
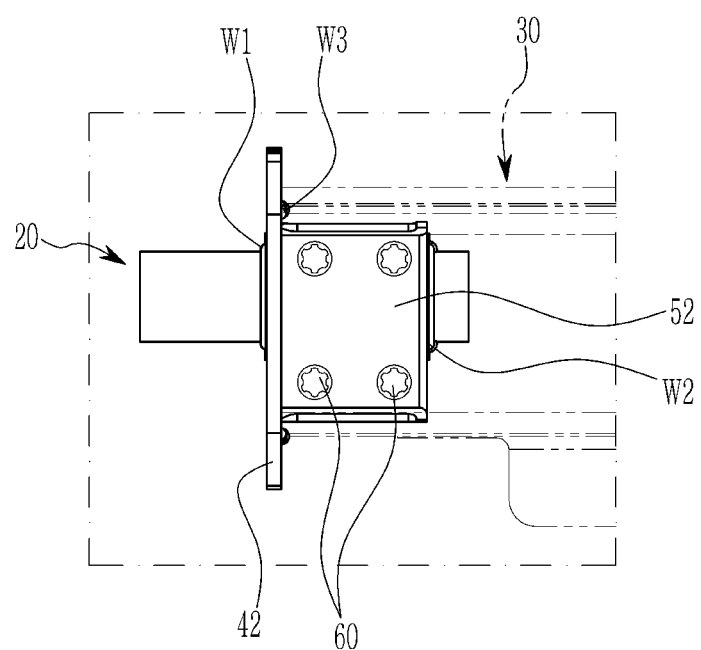
FIG. 3 is a partial side view of a towing pipe connection structure according to one exemplary embodiment of the present invention.
Figure 4:
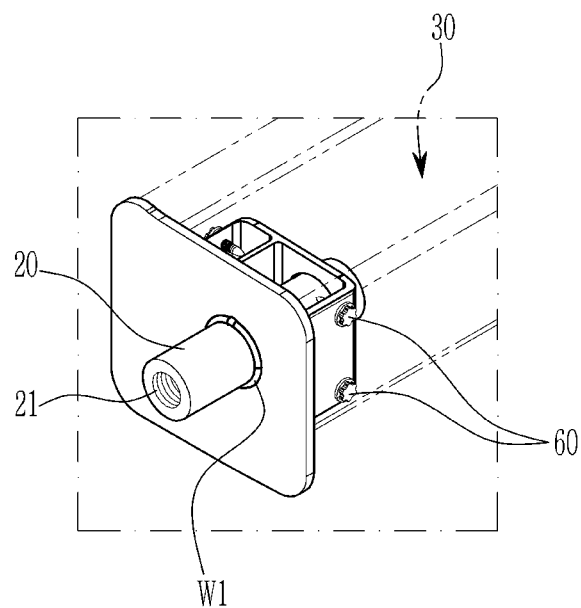
FIG. 4 is a partial perspective view of a towing pipe connection structure according to one exemplary embodiment of the present invention.

FIG. 3 is a partial side view of a towing pipe connection structure according to one exemplary embodiment of the present invention, and FIG. 4 is a partial perspective view of a towing pipe connection structure according to one exemplary embodiment of the present invention.

Figure 5:
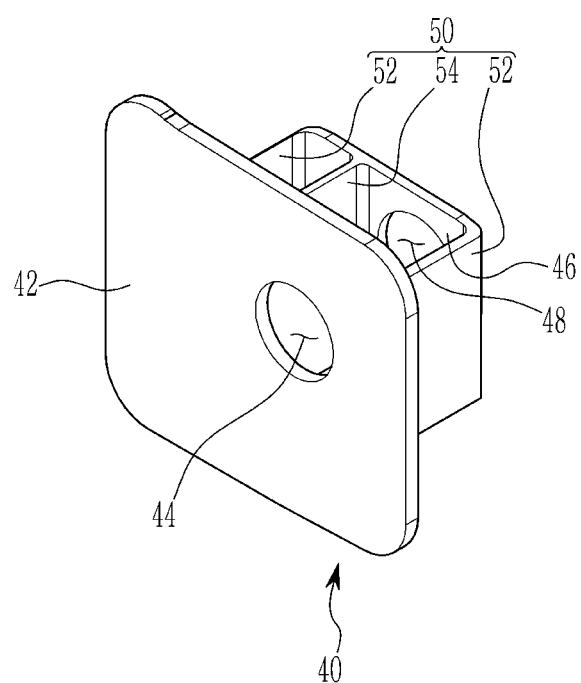
FIG. 5 is a perspective view of a connecting bracket of a towing pipe connection structure according to one exemplary embodiment of the present invention.
Figure 6:
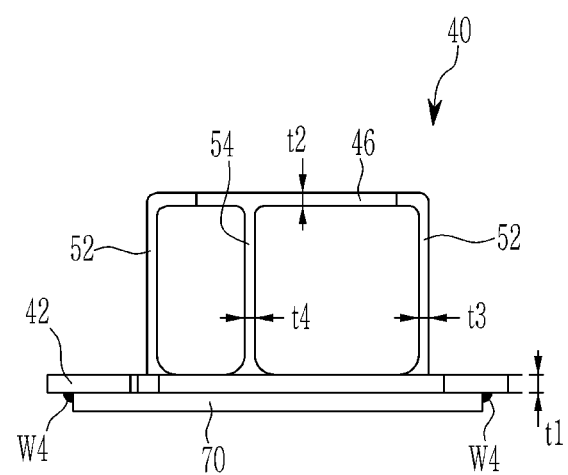
FIG. 6 is a top plan view of a connecting bracket of a towing pipe connection structure according to one exemplary embodiment of the present invention.

FIG. 5 is a perspective view of a connecting bracket of a towing pipe connection structure according to one exemplary embodiment of the present invention, and FIG. 6 is a top plan view of a connecting bracket of a towing pipe connection structure according to one exemplary embodiment of the present invention.

Figure 7:
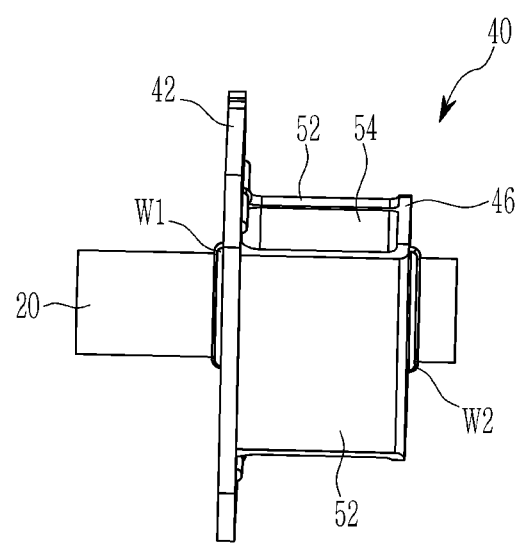
FIG. 7 is a side view showing a connection of a towing pipe and a connecting bracket of a towing pipe connection structure according to one exemplary embodiment of the present invention.
Figure 8:
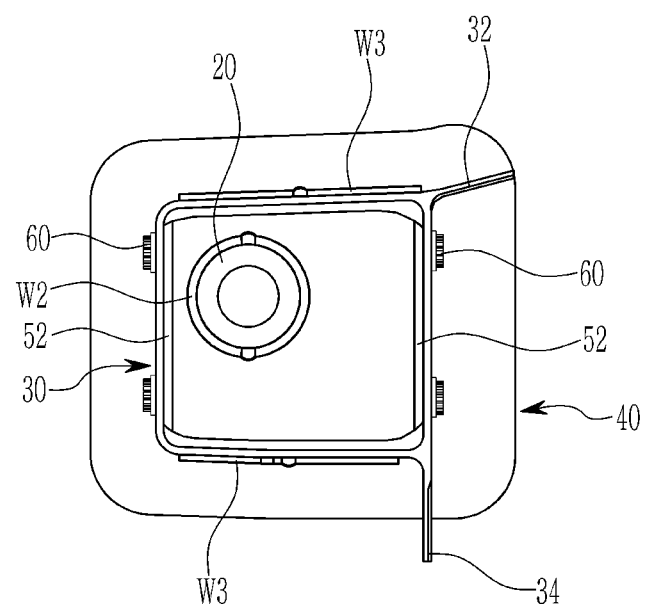
FIG. 8 is a front view showing a connection of a towing pipe and a connecting bracket of a towing pipe connection structure according to one exemplary embodiment of the present invention.

FIG. 7 is a side view showing a connection of a towing pipe and a connecting bracket of a towing pipe connection structure according to one exemplary embodiment of the present invention, and FIG. 8 is a front view showing a connection of a towing pipe and a connecting bracket of a towing pipe connection structure according to one exemplary embodiment of the present invention.

Hereinafter, referring to FIG. 1 to FIG. 8, the towing pipe connection structure according to one exemplary embodiment of the present invention will be described.

The towing pipe 20 may be at least partially made of aluminum material.

The connection bracket 40 may include a bumper back beam plate 42, which is in contact with a back panel 70 of the vehicle body 10 and of which an insertion hole 44 into which the towing pipe 20 is inserted is formed thereto, an engage plate 46 of which an engage hole 48 to which the towing pipe 20 is connected is formed thereto, and a connection plate 50 connecting the bumper back beam plate 42 and the engage plate 46.

The connection bracket 40 may be made of aluminum material.

The towing pipe 20 may be made entirely of aluminum material.

For example, the towing pipe 20 may be made of a single pipe, and may be made of aluminum material to reduce vehicle weight.

Referring to FIG. 3, the towing pipe 20 may be welded around the insertion hole 44 and around the engage hole 48.

That is, the towing pipe 20 is inserted through the insertion hole 44 and in the state inserted into the engage hole 48, the periphery of the insertion hole 44 is welded W1 to combine the towing pipe 20 and the bumper back beam plate 42, and the periphery of the fastening hole 48 is welded W2 to combine the towing pipe 20 and the fastening plate 46.

If the towing pipe 20 and the connection bracket 40 are made of the same or similar aluminum-based material, the towing pipe 20 and the connection bracket 40 may be connected by welding.

For example, the towing pipe 20 and the connection bracket 40 may be welded with MIG (Metal Inert Gas) welding, but is not limited thereto.

The bumper back beam plate 42 and the vehicle body rear member 30 may be welded W3 together.

When the bumper back beam plate 42 and the vehicle body rear member 30 are made of the same or similar aluminum-based material, the bumper back beam plate 42 and the vehicle body rear member 30 may be connected by welding W3 together.

For example, the bumper back beam plate 42 and the vehicle body rear member 30 may be welded with MIG welding, but is not limited thereto.

Referring to FIG. 4, a tow thread 21 may be formed inside the towing pipe 20.

That is, if towing of the vehicle is required, a towing rod (not shown) may be coupled to the towing pipe 20 by connecting it to the tow thread 21.

Referring to FIG. 6, the back panel 70 in contact with the bumper back beam plate 42 can be made of aluminum or steel material, and when the back panel 70 is made of aluminum material, the bumper back beam plate 42 and the back panel 70 may be welded W4 together.

That is, when the bumper back beam plate 42 and the back panel 70 are made of the same or similar aluminum-based material, the bumper back beam plate 42 and the back panel 70 can be joined by welding W4 together.

For example, with MIG welding, the bumper back beam plate 42 and the back panel 70 may be welded W4, but is not limited thereto.

The connection plate 50 may include at least two side plates 52 connected with the vehicle body rear member 30.

Referring to FIG. 3, FIG. 4 and FIG. 8, the side plate 52 is inserted inside the vehicle body rear member 30, and the side plate 52 and the vehicle body rear member 30 may be connected with a fastener 60.

For example, various types of physical coupling members such as FDS (Flow Drill Screw) and riveted may be applied to the fastener 60, and connection strength between the vehicle body rear member 30 and the connection bracket 40 may be secured.

The connection plate 50 may further include at least one reinforcement plate 54 connecting the bumper back beam plate 42 and the engage plate 46 between the side plates 52.

The reinforcement plate 54 may secure the strength of the connection bracket 40 by connecting the bumper back beam plate 42 and the engage plate 46 together with the side plates 52.

Referring to FIG. 6, the thickness t1 of the bumper back beam plate 42 may be formed thicker than the thickness t2 of the engage plate 46.

That is, the bumper back beam plate 42 receives the greatest load in the towing situation, so the thickness t1 of the bumper back beam plate 42 may be made thicker than the thickness t2 of the engage plate 46 to prevent damage.

The thickness t2 of the engage plate 46 may be thicker than the thickness of the connection plate 50, that is, thickness t3 of the side plate 52 or thickness t4 of the reinforcement plate 54.

Since the engage plate 46 connected to the towing pipe 20 is subjected to a large load in the towing situation, it is possible to prevent breakage by making the thickness t2 of the engage plate 46 thicker than the thicknesses t4 and t4 of the connection plate 50.

The thickness t3 of the side plate 52 may be equal to or thicker than the thickness t4 of the reinforcement plate 54.

Since the side plate 52 is physically connected to the vehicle body rear member 30 through the fastener 60, the thickness t3 of the side plate 52 may be equal to or thicker than the thickness t4 of the reinforcement plate 54.

In FIG. 8, drawing reference numerals 32 and 34 are flanges formed on the vehicle body rear member 30, and may be connected to the vehicle body 10.

According to the towing pipe connection structure according to one exemplary embodiment of the present invention, the configuration of the connection bracket 40 is simple, and the coupling of the connection bracket 40 and the towing pipe 20 and the vehicle body rear member 30 is simple, so that the connectivity may be improved while reducing the entire number of parts.

According to the towing pipe connection structure according to one exemplary embodiment of the present invention, the cross-section of the vehicle body rear member 30 may have a uniform shape, so that uniform transmission of the impact load is possible during vehicle collision.

Figure 9:
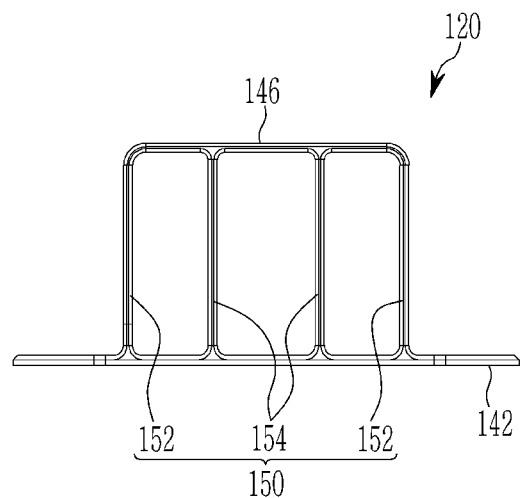
FIG. 9 is a top plan view of a connecting bracket of a towing pipe connection structure according to another exemplary embodiment of the present invention.
Figure 10:
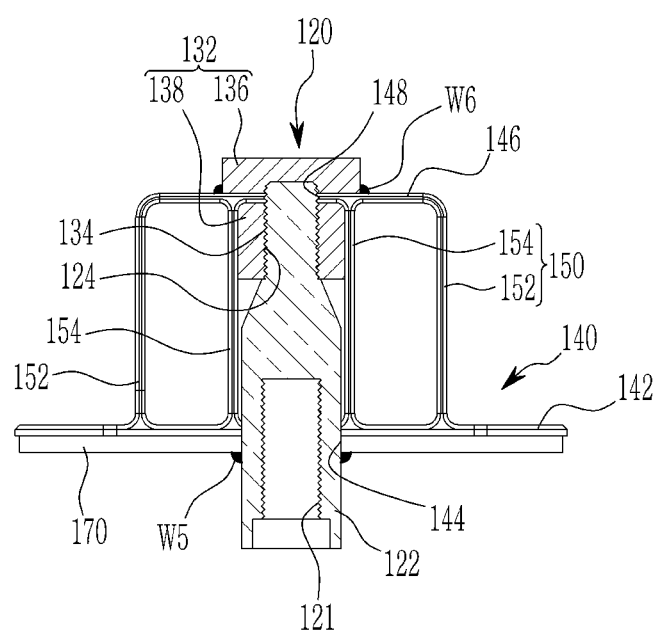
FIG. 10 is a top plan view showing a connection of a towing pipe and a connecting bracket of a towing pipe connection structure according to another exemplary embodiment of the present invention.

FIG. 9 is a top plan view of a connecting bracket of a towing pipe connection structure according to another exemplary embodiment of the present invention, and FIG. 10 is a top plan view showing a connection of a towing pipe and a connecting bracket of a towing pipe connection structure according to another exemplary embodiment of the present invention.

In describing the towing pipe connection structure according to another exemplary embodiment of the present invention, a repeated description of the same configuration as the towing pipe connection structure according to one exemplary embodiment of the present invention described above will be omitted.

The towing pipe that may be applied to the towing pipe connection structure according to another exemplary embodiment of the present invention may be made of a heterogeneous material.

That is, the towing pipe 120 that may be applied to the towing pipe connection structure according to another exemplary embodiment of the present invention may include a steel portion 122 that is made of a steel material and is inserted into a bumper back beam plate 142, and an aluminum portion 132 that is made of aluminum material and inserted into an engage hole 148.

A connection bracket 140 that may be applied to the towing pipe connection structure according to another exemplary embodiment of the present invention may include a bumper back beam plate 142 in contact with a back panel 170 of the vehicle body 10 and a insertion hole 144 into which the towing pipe 120 is inserted is formed thereto, an engage plate 146 of which an engage hole 148 to which the towing pipe 120 is connected is formed thereto, and a connection plate 150 connecting the bumper back beam plate 142 and the engage plate 146.

The steel portion 122 and the aluminum portion 132 may be screwed together.

That is, a steel portion thread 124 is formed in the steel portion 122, and an aluminum portion thread 134 is formed in the aluminum portion 132, so that the steel portion thread 124 and the aluminum portion thread 134 may be screwed together.

The connection bracket 140 that may be applied to the towing pipe connection structure according to another exemplary embodiment of the present invention may be made of an aluminum material, so it is possible to reduce the weight of parts.

Also, the connection bracket 140 may be manufactured by extrusion.

The back panel 170 in contact with the bumper back beam plate 142 is made of a steel material, and the steel portion 122 and the back panel 170 may be welded W5 together.

That is, the bumper back beam plate 142 and the back panel 170 have different materials, so welding work is difficult, but the steel portion 122 and the back panel 170 are made of the same or similar steel material, so that the steel portion 122 and the back panel 170 can be connected by welding W5 together.

And, according to the welding W5 of the steel portion 122 and the back panel 170, the connection work of the bumper back beam plate 142 and the back panel 170 is not required, so the work process can be simplified.

The aluminum portion 132 can be welded W6 around the engage hole 148.

That is, the aluminum portion 132 is the same or similar aluminum material to the engage plate 146 in which the engage hole 148 is formed, so that it can be welded W6 together.

For example, the aluminum portion 132 and the engage plate 146 may be welded with MIG welding, but is not limited thereto.

The aluminum portion 132 may include a first body 136 to be welded around the engage hole 148, and a second body 138 connected to the first body 136 and inserted into the engage hole 148 with a cross-section smaller than the first body 136.

Another exemplary embodiment of the towing pipe connection structure according to the present invention may include a connection plate 150 for connecting the bumper back beam plate 142 and the engage plate 146.

The connection plate 150 may include at least two side plates 152 connected with the vehicle body rear member 30 (referring to FIG. 3 and FIG. 4).

The connection plate 150 may further include at least one reinforcement plate 154 connecting the bumper back beam plate 142 and the engage plate 146 between the side plates 152.

The reinforcement plate 154 may be provided in two so that the two reinforcement plates 154 may support the towing pipe 120, so the connection of the towing pipe 120 and the connection bracket 140 may be more robust.

A tow thread 121 may be formed inside the towing pipe 120, that is, inside the steel portion 122.

According to another exemplary embodiment of the towing pipe connection structure according to the present invention, the configuration of the connection bracket 140 is simple, and the combination of the connection bracket 140 and the towing pipe 120 and the vehicle body rear member 30 is simple. So that connectivity may be improved while reducing the entire number of parts.

In addition, according to the towing pipe connection structure according to another exemplary embodiment of the present invention, even if the back panel 170 is made of other materials such as steel, it is possible to firmly combine the vehicle body rear member 30 and the towing pipe 120 of aluminum material.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A towing pipe connection structure comprising:
    a vehicle body rear member comprising an aluminum material;
    a towing pipe at least partially comprising an aluminum material; and
    a connection bracket comprising:
        a bumper back beam plate in contact with a back panel of a vehicle body and comprising an insertion hole into which the towing pipe is inserted;
        an engage plate comprising an engage hole to which the towing pipe is connected; and
        a connection plate connecting the bumper back beam plate and the engage plate,
    wherein the connection bracket is connected to the rear member of the vehicle body, and
    wherein the connection bracket comprises an aluminum material.

2. The towing pipe connection structure of claim 1, wherein the towing pipe is entirely made of the aluminum material.

3. The towing pipe connection structure of claim 2, wherein the towing pipe is welded around the insertion hole and around the engage hole.

4. The towing pipe connection structure of claim 2, wherein the back panel in contact with the bumper back beam plate comprises an aluminum material.

5. The towing pipe connection structure of claim 4, wherein the bumper back beam plate and the back panel are welded together.

6. The towing pipe connection structure of claim 2, wherein the bumper back beam plate is thicker than the engage plate.

7. The towing pipe connection structure of claim 6, wherein the engage plate is thicker than the connection plate.

8. The towing pipe connection structure of claim 1, wherein the connection plate comprises at least two side plates connected to the rear member of the vehicle body.

9. The towing pipe connection structure of claim 1, wherein the bumper back beam plate and the rear member of the vehicle body are welded together.

10. The towing pipe connection structure of claim 1, wherein the towing pipe comprises:
    a steel portion comprising a steel material inserted into the bumper back beam plate, and
    an aluminum portion comprising an aluminum material inserted into the engage hole.

11. The towing pipe connection structure of claim 10, wherein the steel portion and the aluminum portion are screwed together.

12. The towing pipe connection structure of claim 10,
    wherein the back panel in contact with the bumper back beam plate comprises a steel material, and
    wherein the steel portion and the back panel are welded together.

13. The towing pipe connection structure of claim 10, wherein the aluminum portion is welded around the engage hole.

14. The towing pipe connection structure of claim 13, wherein the aluminum portion comprises:
    a first body to be welded around the engage hole, and a second body connected to the first body and inserted into the engage hole with a cross-section smaller than the first body.

15. The towing pipe connection structure of claim 10, wherein the connection plate comprises at least two side plates connected with the rear member of the vehicle body.

16. The towing pipe connection structure of claim 15, wherein the connection plate further comprises at least one reinforcement plate connecting the bumper back beam plate and the engage plate between the side plates.

17. The towing pipe connection structure of claim 15, wherein the connection plate further comprises two reinforcement plates connecting the bumper back beam plate and the engage plate between the side plates, and wherein the two reinforcement plates support the towing pipe.

18. The towing pipe connection structure of claim 1, wherein the rear member of the vehicle body and the back panel of the vehicle body are arranged orthogonally.

19. A device comprising:
 a towing pipe at least partially comprising an aluminum material; and
 a connection bracket comprising:
  a bumper back beam plate configured to contact a back panel of a vehicle body and comprising an insertion hole into which the towing pipe is insertable;
  an engage plate comprising an engage hole to which the towing pipe is connected; and
  a connection plate connecting the bumper back beam plate and the engage plate,
 wherein the connection bracket is connectable to a rear member of the vehicle body, and
 wherein the connection bracket comprises an aluminum material.

* * * * *